United States Patent
Delaby et al.

(10) Patent No.: US 9,551,378 B2
(45) Date of Patent: Jan. 24, 2017

(54) ROLLING BEARING WITH MEANS FOR ANGULARLY ADJUSTING OF THE INNER RING RELATIVE TO THE OUTER RING

(71) Applicants: Juliette Delaby, Charentenay (FR); Marie-Joelle Huot-Marchand, Diges (FR); Michel Nicolas, Annay la Côte (FR)

(72) Inventors: Juliette Delaby, Charentenay (FR); Marie-Joelle Huot-Marchand, Diges (FR); Michel Nicolas, Annay la Côte (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/731,478

(22) Filed: Jun. 5, 2015

(65) Prior Publication Data
US 2015/0354632 A1      Dec. 10, 2015

(30) Foreign Application Priority Data

Jun. 10, 2014  (EP) ..................................... 14171770

(51) Int. Cl.
| F16C 25/06 | (2006.01) |
| F16C 43/04 | (2006.01) |
| F16C 33/60 | (2006.01) |
| F16C 19/04 | (2006.01) |
| F16C 41/00 | (2006.01) |
| F16C 19/16 | (2006.01) |
| F16C 11/10 | (2006.01) |

(52) U.S. Cl.
CPC ............... *F16C 33/60* (2013.01); *F16C 19/04* (2013.01); *F16C 19/166* (2013.01); *F16C 41/00* (2013.01); *F16C 11/10* (2013.01); *F16C 2300/14* (2013.01); *F16C 2316/10* (2013.01)

(58) Field of Classification Search
CPC ........... F16C 19/06; F16C 19/08; F16C 19/54; F16C 25/06; F16C 43/06; F16C 2316/10
USPC .................... 74/526; 384/507, 511, 519, 559
See application file for complete search history.

(56) References Cited

U.S. PATENT DOCUMENTS

| 829,658 A | * | 8/1906 | Leavitt .................... F16C 23/06 384/519 |
| 4,736,075 A | | 4/1988 | Amor et al. |

(Continued)

FOREIGN PATENT DOCUMENTS

| CN | 101769301 A | 7/2010 |
| DE | 102007003970 A1 | 7/2008 |

(Continued)

*Primary Examiner* — Phillip A Johnson
(74) *Attorney, Agent, or Firm* — Bryan Peckjian; SKF USA Inc. Patent Dept.

(57) ABSTRACT

A rolling bearing assembly comprising an inner ring, an outer ring, and at least one row of rolling elements located between raceways provided on each of the inner and outer rings. The rolling bearing assembly comprises an angular adjustment feature for angularly adjusting the inner ring relative to the outer ring, wherein the adjustment feature comprises at least one angular indexing finger extending radially from one of the inner ring and the outer ring towards the other of the inner ring and the outer ring and an arc-shaped stop for the angular indexing finger mounted on the other of the inner ring and the outer ring.

10 Claims, 3 Drawing Sheets

(56) References Cited

U.S. PATENT DOCUMENTS 4,794,814 A * 1/1989 Ferguson, Jr. ........... G05G 5/04
                                                             74/526
4,828,094 A * 5/1989 Torii ........................ B25J 9/101
                                                             192/139

FOREIGN PATENT DOCUMENTS

GB         2318840 A * 5/1998 ............. F16C 19/06
JP         H0320114 A    1/1991

* cited by examiner

ROLLING BEARING WITH MEANS FOR ANGULARLY ADJUSTING OF THE INNER RING RELATIVE TO THE OUTER RING

CROSS REFERENCE TO RELATED APPLICATIONS

This is a Non-Provisional Patent Application, filed under the Paris Convention, claims the benefit of European Patent (EP) Application Number 14171770.2 filed on 10 Jun. 2014, which is incorporated herein by reference in its entirety.

TECHNICAL FIELD

The present invention relates to the field of rolling bearings, in particular rolling bearings having an inner ring, an outer ring and one or more rows of rolling elements held by a cage between raceways provided on the rings. The rolling elements may, for example, be balls. The rolling bearings may, for example, be slewing bearings used in medical systems, food processing industries or pharmaceutical industries.

TECHNICAL BACKGROUND

In such applications, known ISO deep groove ball bearings are usually used. These bearings comprise inner and outer rings of the massive or solid type. A "solid ring" is to be understood as a ring obtained by machining with removal of material (by turning, grinding) from steel tube stock, bar stock, rough forgings and/or rolled blanks.

However, in order to precisely position medical devices, there is a need in adjusting the angular position of the inner ring relative to the outer ring.

SUMMARY OF THE INVENTION

It is a particular object of the present invention to provide a rolling bearing with integrated means for adjusting the angular position of the inner ring relative to the outer ring.

In one embodiment, a rolling bearing assembly comprises an inner ring, an outer ring and at least one row of rolling elements located between raceways provided on the inner and outer rings.

The rolling bearing assembly comprises means for angularly adjusting the inner ring relative to the outer ring. The angularly adjusting means comprise at least one angular indexing finger extending radially from one of the rings towards the other ring and an arc-shaped stop for the angular indexing finger mounted on the other ring.

Advantageously, the angular indexing finger extends radially away from the outer cylindrical surface of the inner ring within an axial annular recess provided on the outer ring, and the arc-shaped stop for the angular indexing finger is mounted in the axial annular recess.

In one embodiment, the annular recess is provided axially on one of the lateral surface of the outer ring, forming a passage way for the angular indexing finger when one of the rings rotates relative to the other ring.

In one embodiment, the angular indexing finger has the shape of a cylindrical pin adapted to be mounted within at least one complementary indexing radial hole provided radially on the outer surface of the inner ring.

The inner ring may comprises on its outer surface a number of at least two indexing radial holes, for example a number of sixteen, and the angular indexing finger can be mobile in order to be positioned in any of the radial holes. The indexing radial holes may be circumferentially regularly spaced.

In one embodiment, the outer ring comprises at least one radial through-hole in order to access the axial annular recess.

In one embodiment, the radial through-hole is closed with a cap.

In one embodiment, the stop has the shape of an arc of circle of 20°, such that the inner ring can angularly rotate within a range of +/−170° relative to the outer ring.

In one embodiment, the stop is provided with two lateral shock absorbers for damping the circumferential contact between the angular indexing finger and the arc-shaped stop.

In one embodiment, the rolling bearing comprises a filler plug mounted radially in a radial through-hole provided in the inner ring, the filler plug being of substantially cylindrical shape and having at one end a toroidal groove forming a bearing raceway for the rolling elements.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE PRESENT INVENTION

Figure 1:
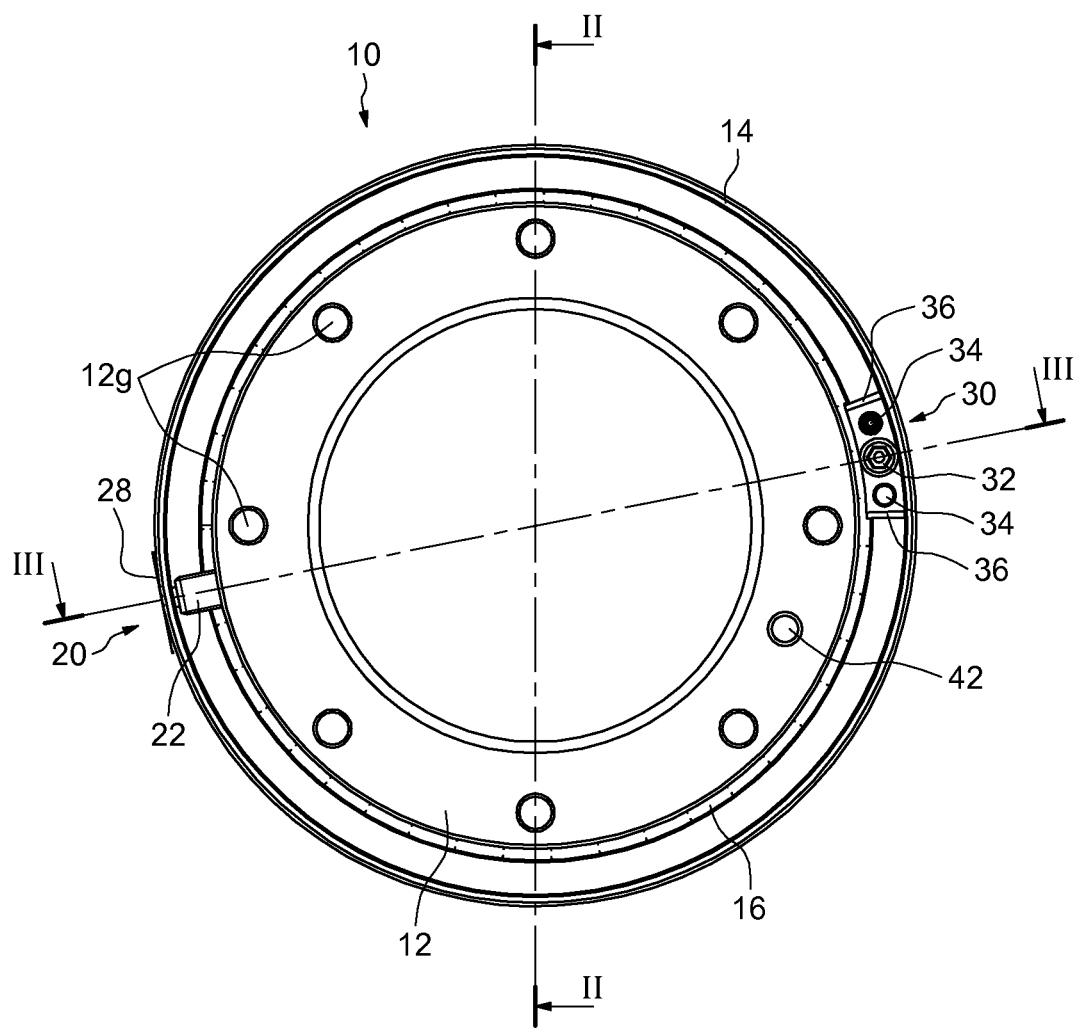
FIG. 1 is a top view of a rolling bearing according to the invention.
Figure 2:
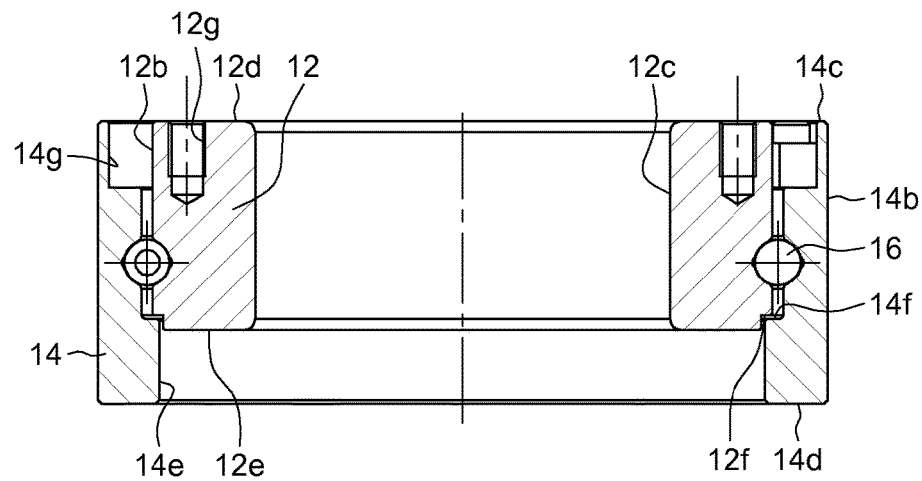
FIG. 2 is a cross-section along line II-II of FIG. 1.
Figure 3:
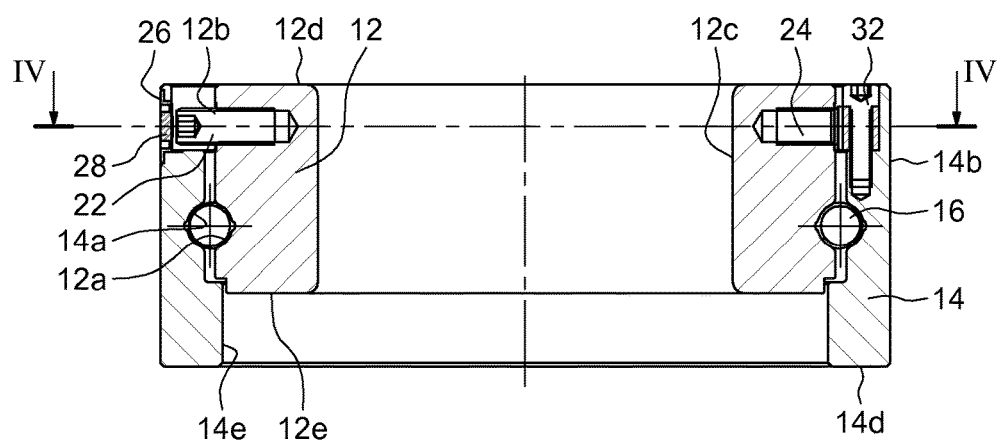
FIG. 3 is a cross-section along line III-III of FIG. 1.
Figure 4:
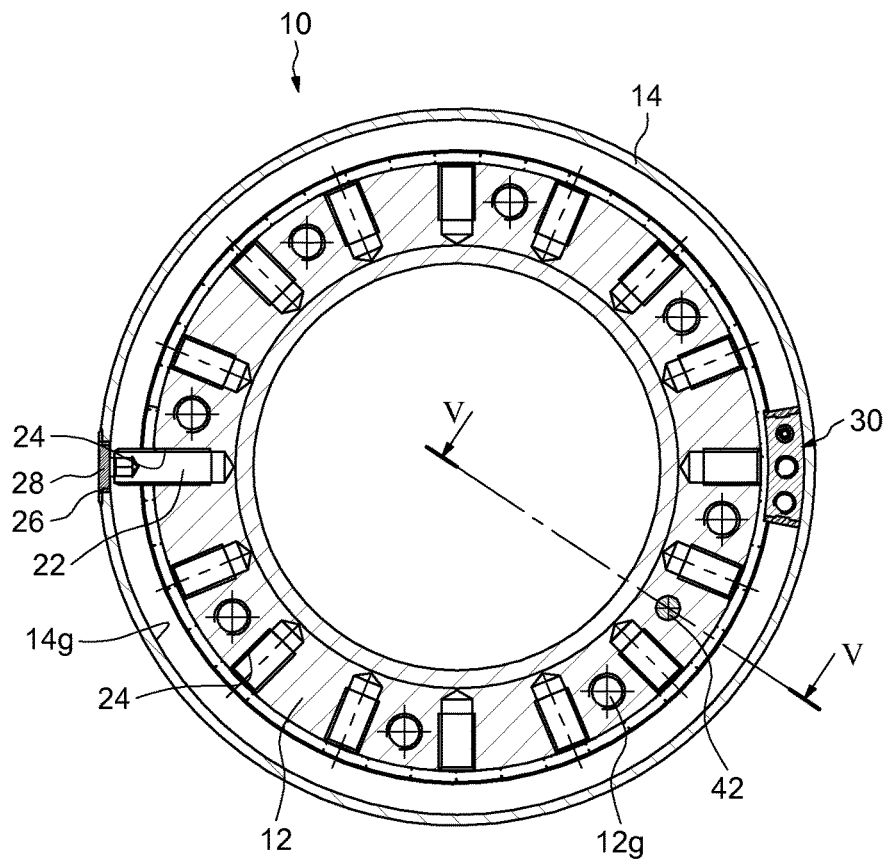
FIG. 4 is a cross-section along line IV-IV of FIG. 3.

As illustrated on the Figures, a rolling bearing assembly, of axial rotation axis X-X and designed by general reference number 10, comprises an inner ring 12, an outer ring 14, a row of rolling elements 16 consisting, in the example illustrated, of balls located between raceways 12a, 14a provided on the inner ring 12 and the outer ring 14. The rolling bearing assembly 10 comprises a cage (not shown) for maintaining an even circumferential spacing between the rolling elements 16.

The inner ring 12 is annular and has on its outer cylindrical surface 12b a toroidal groove 12a, the radius of curvature of which is slightly greater than the radius of the rolling elements 16 and forms a bearing raceway for the rolling elements 16. The inner ring 12 has a bore 12c and two radial lateral surfaces 12d, 12e.

The outer ring 14 is annular and surrounds the inner ring 12. The outer ring 14 has an axial outer surface 14b, two radial lateral surfaces 14c, 14d and a bore 14e from which a raceway 14a of toroidal shape is formed.

As illustrated, the bore 14e of the outer ring 14 comprises a first shoulder 14f forming an axial seat for a shoulder 12f provided on the outer surface 12b of the inner ring 12.

As illustrated, the inner ring 12 comprises axial holes 12g located circumferentially on one of the lateral surface 12d of the inner ring 12 and adapted to cooperate with fixing means (not shown) for assembling the inner ring 12 to another device (not shown). The outer ring 14 also comprises axial holes (not shown in the figures) located circumferentially on one of the lateral surface 14f, opposite to the lateral surface 12d of the inner ring provided with axial holes 12g, and adapted to cooperate with fixing means (not shown) for assembling the outer ring 14 to another device (not shown). As an alternative, any other appropriate means may be used to fix the inner and outer rings with external elements of the rolling bearing.

The rolling bearing 10 comprises an angular adjustment feature 20 for angularly adjusting the inner ring 12 relative to the outer ring 14. As illustrated, the angularly adjusting feature 20 comprise an angular indexing finger 22 having the shape of a cylindrical pin adapted to cooperate with a complementary indexing radial hole 24 provided radially on the outer surface 12b of the inner ring 12. The angular indexing finger 22 radially extends from the outer cylindrical surface 12b of the inner ring 12 towards the outer ring 14.

As illustrated, the inner ring 12 comprises on its outer surface 12b a number of sixteen radial holes 24 circumferentially regularly spaced. The angular indexing finger 22 is mobile and can thus be positioned radially in any of the radial holes 24. The radial holes may be disposed circumferentially without being regularly spaced. As an alternative, the inner ring 12 may comprise on its outer surface 12b at least one radial hole 24.

The outer ring 14 comprises one radial hole 26, which can be closed with a cap 28, in order to access to the angular indexing finger 22. The outer ring 14 comprises on its lateral surface 14c, an axial annular recess 14g forming a passage way for the angular indexing finger 22 when the inner ring 12 rotates relative to the outer ring 14.

The angularly adjusting feature 20 further comprise an arc-shaped stop 30 mounted fixedly on the outer ring 14. As illustrated, the stop 30 has the shape of an arc of circle of 20°. As an alternative, the stop 30 may form a circle arc of less or more than 20°.

Thanks to the angular indexing finger 22 combined with the arc-shaped stop 30, the angular position of the inner ring 12 relative to the outer ring 14 is easily set and maintained.

The stop 30 is mounted in the annular recess 14g and is fixed to the outer ring 14 with fixing means such as, for example, a central screw 32 and two lateral screws 34. The arc-shaped stop 30 is in radial contact with the inner surface of the axial annular recess 14g of the outer ring 14. The stop 30 may be made of steel with at minimum same mechanical characteristics than the rings material. As illustrated, the stop 30 is provided with two lateral shock absorbers 36 made, for example, in synthetic material such as rubber, for damping the circumferential contact between the angular indexing finger 22 and the arc-shaped stop 30.

As an alternative, the angular indexing finger 22 of the angularly adjusting feature 20 can be mounted radially in a radial through-hole provided on the outer ring 14 in such a way to extend radially towards the inner ring 12 in the annular recess 14g. In this alternative, the arc-shaped stop 30 would thus be mounted on the outer cylindrical surface 12b of the inner ring 12. Such alternative is however conditioned by space for accessibility.

Figure 5:
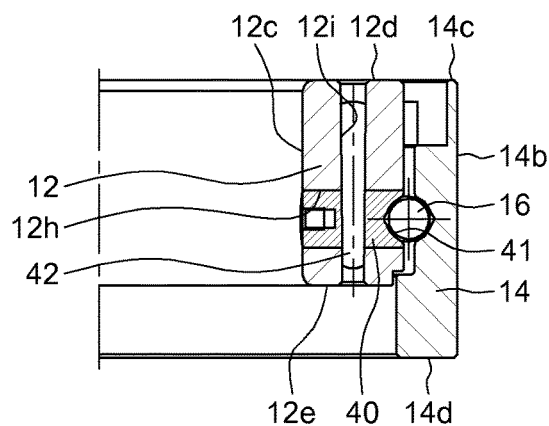
FIG. 5 is a cross-section along line V-V of FIG. 4.

As illustrated in details on FIG. 5, the rolling bearing 10 comprises a filler plug 40 of substantially cylindrical shape having at one end a toroidal groove 41 forming a bearing raceway for the rolling elements 16. The filler plug 40 is inserted radially in a radial through-hole 12h provided in the inner ring (or in the outer ring if enough space) 12 and is maintained by a tapper pin 42 inserted in an axial through-hole 12i provided in the inner ring 12. The filler plug 40 aims to fill in the rolling elements inside the bearing.

The filler plug 40 may be made of steel material and it is removable from the ring to have access to the raceway without dismounting the bearing, for instance for inserting or removing the rolling elements 16.

Thanks to the invention, the angular displacement of the inner ring relative to the outer ring is adjusted in a range comprised between 20° and 340° with a mechanical indexing system or angularly adjusting feature 20 comprising a mobile angular indexing finger 22 combined with a fixed arc-shaped stop 30. Furthermore, the mechanical indexing system is located inside the rolling bearing, which does not increase the over-all dimension of the rolling bearing.

What is claimed is:

1. A rolling bearing assembly comprising:
   an inner ring comprising at least two indexing radial holes, wherein the at least two indexing radial holes are located on an outer cylindrical surface of the inner ring,
   an outer ring,
   at least one row of rolling elements located between raceways provided on the inner and outer rings,
   an angular adjusting feature for angularly adjusting the inner ring relative to the outer ring, wherein the angular adjusting feature comprises at least one angular indexing finger extending radially away from the outer cylindrical surface of the inner ring in an axial annular recess provided on the outer ring, an arc-shaped stop for the at least one angular indexing finger mounted on the outer ring, the arc-shaped stop for the at least one angular indexing finger is mounted in the axial annular recess,
   wherein the at least one angular indexing finger has a shape of a cylindrical pin adapted to be mounted within each of the at least two indexing radial holes provided radially on the outer cylindrical surface of the inner ring, each of the at least two indexing radial holes having a shape corresponding to the shape of the at least one angular indexing finger.

2. The rolling bearing assembly according to claim 1, wherein the axial annular recess is provided axially on one of a lateral surface of the outer ring, forming a passage way for the at least one angular indexing finger when one of the inner ring and the outer ring rotates relative to the other of the inner ring and the outer ring.

3. The rolling bearing assembly according to claim 1, wherein the at least one angular indexing finger is mobile enabling positioning of the at least one angular indexing finger in any of the at least two indexing radial holes.

4. The rolling bearing assembly according to claim 1, the inner ring further comprising sixteen indexing radial holes, wherein the sixteen indexing radial holes are located on the outer cylindrical surface of the inner ring.

5. The rolling bearing assembly according to claim 4, wherein the indexing radial holes are circumferentially regularly spaced.

6. The rolling bearing assembly according to claim 1, wherein the arc-shaped stop has the shape of an arc of circle of 20° (twenty degrees).

7. The rolling bearing assembly according to claim 1, the arc-shaped stop further comprising two lateral shock absorbers for damping the circumferential contact between the at least one angular indexing finger and the arc-shaped stop.

8. A rolling bearing assembly comprising:
   an inner ring,
   an outer ring,
   at least one row of rolling elements located between raceways provided on the inner and outer rings,
   an angular adjusting feature for angularly adjusting the inner ring relative to the outer ring, wherein the angular adjusting feature comprises at least one angular indexing finger extending radially away from an outer cylindrical surface of the inner ring in an axial annular recess provided on the outer ring, an arc-shaped stop for the at least one angular indexing finger mounted on the outer ring, the arc-shaped stop for the at least one angular indexing finger is mounted in the axial annular recess, the outer ring further comprising at least one radial through-hole in order to access the axial annular recess.

9. The rolling bearing assembly according to claim 8, wherein the at least one radial through-hole is closed with a cap.

10. A rolling bearing assembly comprising:

an inner ring, an outer ring, at least one row of rolling elements located between raceways provided on the inner and outer rings, an angular adjusting feature for angularly adjusting the inner ring relative to the outer ring, wherein the angular adjusting feature comprises at least one angular indexing finger extending radially from one of the inner ring and the outer ring towards the other of the inner ring and the outer ring and an arc-shaped stop for the at least one angular indexing finger mounted on the other of the inner ring and the outer ring, the rolling bearing assembly further comprising a filler plug mounted radially in a radial through-hole provided in the inner ring, the filler plug being of substantially cylindrical shape, and having at one end a toroidal groove forming a bearing raceway for the rolling elements.

* * * * *